(No Model.)
G. S. BRAINERD.
STEAM TRAP.
No. 583,394. Patented May 25, 1897.
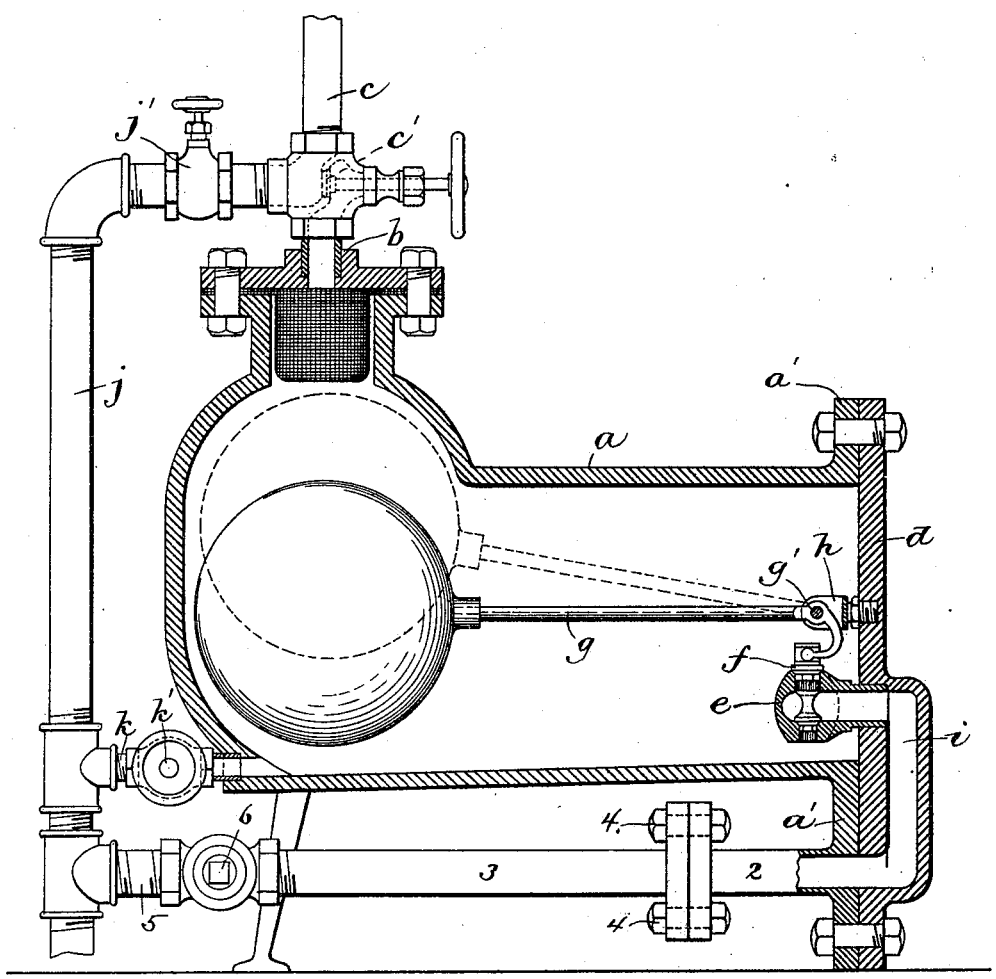
WITNESSES:
A. D. Harrison.
P. W. Pezzatte
INVENTOR:
Geo. S. Brainerd
by Wright Brown Quinby
attys.

UNITED STATES PATENT OFFICE.

GEORGE SEGUR BRAINERD, OF BOSTON, MASSACHUSETTS.

STEAM-TRAP.

SPECIFICATION forming part of Letters Patent No. 583,394, dated May 25, 1897.

Application filed July 6, 1896. Serial No. 598,116. (No model.)

*To all whom it may concern:*

Be it known that I, GEORGE SEGUR BRAINERD, of Boston, in the county of Suffolk and State of Massachusetts, have invented certain new and useful Improvements in Steam-Traps, of which the following is a specification.

This invention relates to a steam-trap of the general construction shown in Letters Patent of the United States No. 546,606, granted to me September 17, 1895; and it has for its object to provide certain improvements on the construction set forth in said patent whereby the disconnection and assemblage of the parts of the trap are rendered more convenient.

The invention consists in the improvements which I will now proceed to describe and claim.

The accompanying drawing, forming a part of this specification, represents a side elevation, partly in section, showing a trap embodying my improvements.

In the drawing, $a$ represents a chamber for the reception of steam and water of condensation. In the upper portion of said chamber is an inlet $b$, with which is connected a supply-pipe $c$, through which the steam and water of condensation enter the chamber. On one end of the chamber is formed a flange $a'$, having a faced and planed outer surface to form a tight joint with the removable end piece or head $d$. The flange $a'$ is provided below the chamber $a$ with an outlet-pipe, which is preferably composed of a pipe-section 2, formed integral with the flange and projecting from the side thereof opposite that upon which the removable end piece $d$ bears, and another section 3, which is detachably secured by means of bolts 4 4 to the section 2.

$e$ represents a valve-casing which is secured to the end piece $d$ and is located within the chamber $a$ and contains a valve $f$, with which is connected a float-lever $g$, pivoted at $g'$ to an ear $h$, affixed to the end piece $d$. The valve-casing communicates with the upper end of the outlet-passage $i$, formed in the end piece $d$, the lower end of said passage communicating with the section 2 of the outlet-pipe. The valve-casing and the valve are constructed so that when the valve is depressed it shuts off communication between the interior of the chamber and the outlet-passage $i$. When the valve is raised by an accumulation of water in the chamber, said water acting on the float-lever and raising it to the position shown in dotted lines, communication is opened between the interior of the chamber and the outlet-passage $i$.

$j$ represents a by-pass which is connected with the supply-pipe $c$ above the chamber $a$ and with the section 3 of the outlet-pipe below the chamber. Said by-pass is provided with a valve $j'$, whereby it may be closed. The supply-pipe is provided with a valve $c'$, constructed to prevent the passage of steam and water into the chamber $a$ and at the same time permit their passage into the by-pass, so that the use of the trap may be discontinued without interrupting the flow of the steam and water, the valve $c'$ being adjusted to prevent the entrance of steam and water into the chamber $a$ and the valve $j'$ opened to permit the steam and water to flow to the waste-pipe through the by-pass $j$.

It will be observed that the movable end piece $d$, which supports the valve-casing and the float-lever, is entirely independent of the outlet-pipe and may be removed with said float-lever and valve-casing from the chamber $a$ without disturbing either the outlet-pipe or the by-pass. This independent removability of the end piece $d$, with the float-lever and the valve-casing, distinguishes my present construction from that shown in my former patent above mentioned, in which the by-pass and outlet are shown as connected directly with the removable end piece which supports the float-lever and valve-casing, said former construction necessitating the disconnection of the by-pass and outlet from the removable end piece before the latter can be removed to permit access to the float-lever and valve-casing. It will be seen that the improved construction enables the trap to be much more conveniently taken apart and assembled than heretofore.

$k$ represents a pipe connecting the lower portion of the chamber $a$ with the by-pass $j$, said pipe having a valve $k'$. The bottom of the chamber $a$ is inclined, as shown, from the removable end piece $d$ to the pipe $k$, so that sediment accumulating in the chamber can be readily removed by opening the valve $k'$, the inclination of the bottom of the chamber permitting the sediment to flow through the pipe $k$ into the by-pass. The section 3 of the outlet-pipe is connected with the by-pass by a section 5, having a valve 6. The valves 6 and k' are closed when the use of the trap is discontinued.

I claim—

The improved steam-trap, comprising a chamber having an inlet in its upper portion and a flange at one end provided with an outlet-pipe below the chamber, said pipe extending from the rear side of the flange, a valve-casing within the chamber, a valve in said casing, a pivoted float-lever connected with the valve, a supply-pipe connected with the inlet of the chamber, the by-pass connecting the supply-pipe with the outlet-pipe, a valve whereby the by-pass may be opened and closed, a valve in the supply-pipe between the by-pass and chamber whereby the supply-pipe may be closed to discontinue the operation of the trap, the by-pass providing an outlet for the steam and water of condensation when the trap is not in operation, and the end piece or head removably secured to the outer side of said flange, and supporting the float-lever and valve-casing said end piece being provided with an outlet-passage which connects the valve-casing with the outlet-pipe when the end piece is in place, the outlet-pipe and by-pass being entirely independent of the end piece so that the end piece, with the float-lever and valve-casing, may be removed from the chamber without disturbing the outlet and by-pass.

In testimony whereof I have signed my name to this specification, in the presence of two subscribing witnesses, this 2d day of July, A. D. 1896.

GEORGE SEGUR BRAINERD.

Witnesses:
ARTHUR C. HAYES,
JESSIE S. HAYES.